United States Patent [19]

Gebauer et al.

[11] Patent Number: 5,028,636

[45] Date of Patent: Jul. 2, 1991

[54] LIQUID POLYISOCYANATE MIXTURES, A PROCESS FOR THEIR PREPARATION, AND THEIR USE IN THE PREPARATION OF POLYURETHANE FOAMS

[75] Inventors: Herbert Gebauer, Krefeld; Pramod Gupta, Bedburg; Gerhard Heilig, Bergisch Gladbach; Rolf Wiedermann, Odenthal-Voiswinkel, all of Fed. Rep. of Germany

[73] Assignee: Bayer Aktiengesellschaft, Bayerwerk, Fed. Rep. of Germany

[21] Appl. No.: 568,389

[22] Filed: Aug. 16, 1990

[30] Foreign Application Priority Data

Aug. 26, 1989 [DE] Fed. Rep. of Germany ....... 3928330

[51] Int. Cl.$^5$ ............................................. C08G 18/14
[52] U.S. Cl. .................................... 521/131; 521/128; 521/160; 252/182.22
[58] Field of Search ....................... 521/131, 160, 128; 252/182.22

[56] References Cited

U.S. PATENT DOCUMENTS 4,261,852 4/1981 Carroll et al. ...................... 521/160

Primary Examiner—Maurice J. Welsh
Attorney, Agent, or Firm—Joseph C. Gil; Richard E. L. Henderson

[57] ABSTRACT

This invention relates to novel urethane-modified polyisocyanate mixtures of the diphenylmethane series prepared by a process comprising reacting polyisocyanates or polyisocyanate mixtures of the diphenylmethane series with certain monohydric and/or polyhydric alcohols and, optionally, subsequently mixing the initially modified products with polyisocyanates or polyisocyanate mixtures of the diphenylmethane series that have not been modified with urethane groups. This invention further relates to the use of the polyisocyanate mixtures in the preparation of polyurethane foams.

22 Claims, No Drawings

LIQUID POLYISOCYANATE MIXTURES, A PROCESS FOR THEIR PREPARATION, AND THEIR USE IN THE PREPARATION OF POLYURETHANE FOAMS

BACKGROUND OF THE INVENTION

This invention relates to novel urethane-modified polyisocyanate mixtures of the diphenylmethane series; to a process for their preparation by reaction of polyisocyanates or polyisocyanate mixtures of the diphenylmethane series with certain monohydric and/or polyhydric alcohols and, optionally, subsequent mixing of the modification products with polyisocyanates or polyisocyanate mixtures of the diphenylmethane series free from urethane groups; and to the use of the polyisocyanate mixtures in the preparation of polyurethane foams, particularly rigid polyurethane foams.

Polyisocyanates or polyisocyanate mixtures of the diphenylmethane series have been used for many years as polyisocyanate component in the production of polyurethane foams, particularly rigid polyurethane foams. The term "polyisocyanate of the diphenylmethane series" is the generic term for all diisocyanates and polyisocyanates that are formed in the phosgenation of aniline/formaldehyde condensates and which are present as a mixture in the phosgenation products. The term "polyisocyanate mixture of the diphenylmethane series" encompasses mixtures of "polyisocyanates of the diphenylmethane series", that is, the above-mentioned phosgenation products of aniline/formaldehyde condensates and mixtures formed by mixing individual "polyisocyanates of the diphenylmethane series" and/or various mixtures thereof, as well as mixtures of "polyisocyanates of the diphenylmethane series" of the type formed as distillate or distillation residue in the partial distillation of phosgenation products of aniline/formaldehyde condensates.

Polyisocyanate mixtures of the diphenylmethane series which have an average NCO functionality of approximately 2 to 3.1 and a viscosity at 25° C. in the range from about 50 to 2,000 mPa•s (preferably in the range from 100 to 700 mPa•s) are preferably used for the production of rigid polyurethane foams. Rigid polyurethane foams, which are used for heat insulation, have previously been prepared from such polyisocyanate mixtures of the diphenylmethane series, suitable polyhydroxyl compounds, blowing agents, and other auxiliaries and additives. Hydrogenfree "chlorofluorocarbons", such as monochlorotrifluoromethane for dichlorodifluoromethane, for example, have been used as the blowing agents because of their low thermal conductivity and their high compatibility with the starting materials.

The thermal conductivity, and hence the heat insulation of polyurethane foams, depends not only on the thermal conductivity of the blowing gas filling the closed cells but also on the diameter of the polyurethane cells. The smaller the diameter and the more uniform the cell structure, the lower will be the thermal conductivity of the foam. A disadvantage of using "alternative" blowing agents, such as low-boiling hydrocarbons (for example, propane, butane or pentane) and/or hydrogen-containing chlorofluorocarbons (such as monochlorodifluoromethane) and/or water, is that, in typical formulations, these blowing agents can lead to comparatively large cell diameters and irregular cell structures. Moreover, the resultant foams show a tendency to form non-uniform surface skins.

It has now surprisingly been found that certain urethane-modified polyisocyanate mixtures based on polyisocyanate mixtures of the diphenylmethane series and certain mono- and/or polyhydric alcohols are excellent starting materials for the preparation of polyurethane foams, particularly rigid polyurethane foams and allow the preparation of fine-cell foams with closed cells having none of the disadvantages discussed above, even when using "alternative" blowing agents of the type mentioned, particularly hydrogen-containing chlorofluorocarbons and/or low-boiling aliphatic hydrocarbons and/or water.

SUMMARY OF THE INVENTION

The present invention relates to liquid urethanemodified polyisocyanate mixtures having an isocyanate content of from about 25 to about 33% obtained by a process comprising reacting (aI) polyisocyanates or polyisocyanate mixtures of the diphenylmethane series having a content of diisocyanatodiphenylmethane isomers of about 30 to 100% by weight (b) substoichiometric quantities of at least one alcohol selected from the group consisting of
  (bI) alkoxylation products of alcohols corresponding to the formula

R-OH wherein R is an aliphatic hydrocarbon group or olefinically unsaturated aliphatic hydrocarbon group containing about 8 to about 24 carbon atoms, wherein at least one mole of alkylene oxide is used per mole of active hydrogen atoms of said alcohol in the preparation of said alkoxylation products, (b2) alkoxylation products of amines corresponding to the formula

R'-NH$_2$ wherein R' is an aliphatic hydrocarbon group or olefinically unsaturated aliphatic hydrocarbon group containing about 8 to about 24 carbon atoms, wherein at least one mole of alkylene oxide is used per mole of active hydrogen atoms of said amine in the preparation of said alkoxylation products, (b3) alkoxylation products of amides corresponding to the formula

R"-CO-NH$_2$ wherein R" is an aliphatic hydrocarbon group or olefinically unsaturated aliphatic hydrocarbon group containing about 8 to about 24 carbon atoms, wherein at least one mole of alkylene oxide is used per mole of active hydrogen atoms of said amide in the preparation of said alkoxylation products, and (b4) at least one of (b1), (b2), and (b3) in admixture with alkoxylation products of monofunctional or polyfunctional starter molecules containing no groups R, R', or R" as defined above and having a molecular weight in the range from about 18 to about 342, wherein at least one mole of alkylene oxide is used per mole of active hydrogen atoms of the starter molecule in the preparation of said alkoxylation products, wherein the average molecular weight ("MW") of component (b) is from about 188 to about 1,200, and wherein the type and quantitative ratios of components (b1), (b2), (b3), and (b4) are selected so that groups R, R', and R" collectively comprise from about 5 to about 82% by weight of component (b);

and, optionally, subsequently mixing the product obtained from reacting components (a1) and (b) with (a2) polyisocyanates or polyisocyanate mixtures of the diphenylmethane series containing no urethane groups and having a content of diisocyanatodiphenylmethane isomers of about 30 to 100% by weight, with the proviso that diisocyanatodiphenylmethane isomers comprise from about 30 to about 90% by weight of the total content of components (a1) and (a2) and polyisocyanates of the diphenylmethane series of higher than difunctionality comprise from about 10 to about 70% by weight of the total content of components (a1) and (a2).

The present invention also relates to a process for the preparation of such urethane-modified polyisocyanate mixtures comprising reacting (aI) polyisocyanates or polyisocyanate mixtures of the diphenylmethane series having a content of diisocyanatodiphenylmethane isomers of about 30 to 100% by weight (b) substoichiometric quantities of at least one alcohol selected from the group consisting of (b1) alkoxylation products of alcohols corresponding to the formula

R-OH wherein R is an aliphatic hydrocarbon group or olefinically unsaturated aliphatic hydrocarbon group containing about 8 to about 24 carbon atoms, wherein at least one mole of alkylene oxide is used per mole of active hydrogen atoms of said alcohol in the preparation of said alkoxylation products, (b2) alkoxylation products of amines corresponding to the formula

R'-NH$_2$ wherein R' is an aliphatic hydrocarbon group or olefinically unsaturated aliphatic hydrocarbon group containing about 8 to about 24 carbon atoms, wherein at least one mole of alkylene oxide is used per mole of active hydrogen atoms of said amine in the preparation of said alkoxylation products, (b3) alkoxylation products of amides corresponding to the formula

R"-CO-NH$_2$ wherein R" is an aliphatic hydrocarbon group or olefinically unsaturated aliphatic hydrocarbon group containing about 8 to about 24 carbon atoms, wherein at least one mole of alkylene oxide is used per mole of active hydrogen atoms of said amide in the preparation of said alkoxylation products, and (b4) at least one of (b1), (b2), and (b3) in admixture with alkoxylation products of monofunctional or polyfunctional starter molecules containing no groups R, R', or R" as defined above and having a molecular weight in the range from about 18 to about 342, wherein at least one mole of alkylene oxide is used per mole of active hydrogen atoms of the starter molecule in the preparation of said alkoxylation products, wherein the average molecular weight ("MW") of component (b) is from about 188 to about 1,200, and wherein the type and quantitative ratios of components (b1), (b2), (b3), and (b4) are selected so that groups R comprise from about 5 to about 82% by weight of component (b);

and, optionally, subsequently mixing the product obtained from reacting components (a1) and (b) with (a2) polyisocyanates or polyisocyanate mixtures of the diphenylmethane series containing no urethane groups and having a content of diisocyanatodiphenylmethane isomers of about 30 to 100% by weight, with the proviso that diisocyanatodiphenylmethane isomers comprise from about 30 to about 90% by weight of the total content of components (a1) and (a2) and polyisocyanates of the diphenylmethane series of higher than difunctionality comprise from about 10 to about 70% by weight of the total content of components (a1) and (a2).

The invention further relates to a method for the preparation of polyurethane foams, particularly rigid polyurethane foams, using such polyisocyanate mixtures as the polyisocyanate component.

DETAILED DESCRIPTION OF THE INVENTION

The polyisocyanate mixtures according to the s invention have an NCO content of about 25 to 33% by weight (preferably 27 to 32.5% by weight) and a viscosity at 25° C. of about 100 to 3,000 mPa•s (preferably 150–2,000 mPa•s).

The polyisocyanate mixtures of the invention are either reaction products of components (a1) and (b) or mixtures of such reaction products with component (a2). The quantity of component (a2) used in the polyisocyanate mixtures of the invention may be from 0 to about 500 parts by weight (preferably from 0 to 300 parts by weight) for every 100 parts by weight of the reaction product of components (a1) and (b). The type of and quantitative ratio between the starting materials used to prepare the polyisocyanate mixtures in the practical application of the process of the invention is selected within the limits of this disclosure so that the mixtures contain a total (i.e., in modified and unmodified form) of about 30 to about 90% by weight (preferably 35 to 55% by weight) of diisocyanatodiphenylmethane isomers and about 10 to about 70% by weight (preferably 45 to 65% by weight) of higher than difunctional polyisocyanates of the diphenylmethane series. These percentages are based on the total quantity of the modified and unmodified polyisocyanates of the diphenylmethane series not including the weight of component (b). The diisocyanatodiphenylmethane isomers present in the mixtures of the invention in modified and unmodified form preferably consist of 25 to 99.5% by weight 4,4'-diisocyanatoo diphenylmethane, 0.5 to 25% by weight 2,4'-diisocyanatodiphenylmethane, and at most 3% by weight 2,2'-diisocyanat In principle, any polyisocyanates or polyisocyanate mixtures of the diphenylmethane series containing 30 to 100% by weight diisocyanatodiphenylmethane isomers are suitable as starting component (a1). Particularly suitable are polyisocyanate mixtures of the diphenylmethane series which isomers, with the balance being relatively high functionality polyisocyanates of the diphenylmethane series, or even diisocyanatodiphenylmethane isomers or isomer mixtures with no polyisocyanates of relatively high functionality. Accordingly, component (a1) may be pure 4,4'-diisocyanatodiphenylmethane; mixtures of 60 to 99.5% by weight of this diisocyanate with 0.5 to 40% by weight 2,4'-diisocyanatodiphenylmethane and 0 to 3% by weight 2,2'-diisocyanatodiphenylmethane; and, in particular, mixtures of these diisocyanates or diisocyanate mixtures with up to 70% by weight (preferably with up to 60% by weight), based on the mixture as a whole, of relatively high functionality polyisocyanates of the diphenylmethane series.

Component (b) consists of at least one alcohol selected from the group of alcohols described as components (b1), (b2), and (b3) and, optionally, of at least one alcohol of the type mentioned hereinafter under (b4).

The alcohols (b1) are monohydric polyether alcohols of the type obtainable by alkoxylation of monohydric alcohols corresponding to the formula

R-OH wherein R is an aliphatic hydrocarbon group or olefinically unsaturated aliphatic hydrocarbon group containing from about 8 to about 24 (preferably from 12 to 18) carbon atoms, in which the functional group (in this case the hydroxyl group) of the starter molecule is preferably attached to a primary carbon atom. Group R may be identical to or different from group R' of component (b2) or group R" of component (b3).

Suitable starter alcohols for the preparation of alcohols (b1) include octanol, isononyl alcohol, decanol, dodecanol, octadecanol, stearyl alcohol, oleyl alcohol, and cetyl alcohol. The alkylene oxides used in the alkoxylation reaction are propylene oxide and/or 1,2-butylene oxide or, in addition to these alkylene oxides, ethylene oxide. The ethylene oxide is used in admixture with propylene oxide and/or 1,2-butylene oxide and/or in a separate reaction step in the alkoxylation reaction. Propylene oxide or 1,2-butylene oxide may also be used in admixture or in separate reaction steps. If used at all, ethylene oxide is used in a quantity of at most 50 mole-percent (preferably no more than 30 mole-percent), based on the total quantity of alkylene oxides used. Mixtures of the monofunctional starter molecules discussed above by way of example may, of course, also be used in the preparation of the monohydric polyether alcohols. In the alkoxylation reaction, at least 1.0 mole (preferably at least 1.5 mole) of alkylene oxide is reacted per mole of active hydrogen atoms of the starter, in the present case an alcohol.

The alcohols (b2) are monohydric polyether alcohols of the type obtainable by alkoxylation of primary amines corresponding to the formula R'-NH

wherein R' is an aliphatic hydrocarbon group or olefinically unsaturated aliphatic hydrocarbon group containing from about 8 to about 24 (preferably from 12 to 18) carbon atoms, in which the functional group (in this case the amino group) of the starter molecule is preferably attached to a primary carbon atom. Group R, may be identical to or different from group R of component (b1) or group R" of component (b3).

Suitable primary amines include octylamine, dodecylamine, octadecylamine, stearylamine, oleylamine, and cetylamine. Mixtures of these primary amines may, of course, also be used in the alkoxylation reaction. The general observations made above in connection with (b1) concerning the types and quantities of alkylene oxides used also apply in regard to (b2).

The alcohols (b3) are alkoxylation products of amides corresponding to the formula R"-CO-NH

wherein R" is an aliphatic hydrocarbon group or olefinically unsaturated aliphatic hydrocarbon group containing from about 8 to about 24 (preferably from 12 to 18) carbon atoms. Group R" may be identical to or different from group R of component (b1) or group R' of component (b2).

Suitable amides include octanoic acid amide, dodecanoic acid amide, oleic acid amide, and stearic acid amide. As with the previously discussed starter molecules, mixtures of the starter molecules discussed above by way of example may, of course, also be used. The general observations made above in connection with (b1) concerning the types and quantities of alkylene oxides used also apply in regard to (b3).

The additional alkoxylation product of component (b4) that is used in admixture with components (b1), (b2), and (b3) may be a monohydric or polyhydric ether alcohol not containing hydrophobic groups R, R', or R" of the types discussed by way of example above. This additional alkoxylation product of (b4) is preferably a polyhydric polyether polyol of the type known from polyurethane chemistry. Suitable starter molecules for the preparation of such polyether alcohols include monohydric alcohols (such as methanol, ethanol, or butanol) or compounds containing preferably at least two hydrogen atoms that are reactive in the alkoxylation reaction and having a molecular weight in the range from 18 to 342 (such as water, propylene glycol, trimethylolpropane, glycerol, bisphenol A, ethylenediamine, 2,3-diaminotoluene, 4,4'-diaminodiphenylmethane, sorbitol, or sucrose). Component (b4) may also include an alkoxylation product of a mixture of such starter molecules. The general observations made above in connection with (b1) concerning the types and quantities of alkylene oxides used also apply in regard to (b4).

As already mentioned, component (b) consists of a single component (b1), (b2), or (b3) or a mixture of several such individual components or of a mixture of one or more such individual components with at least one alcohol of the type described under (b4). Where mixtures are used, they may be prepared by mixing of the individual components or even, as is often preferred, by alkoxylation of a corresponding starter mixture.

Because monohydric alcohols (b1) may be used alone, component (b) has a hydroxyl functionality of at least 1 but preferably has an average hydroxyl functionality of at least 1.3, more preferably from 1.5 to 5. The average functionality is the quotient of the number of moles of hydroxyl groups divided by the number of moles of monohydric and polyhydric alcohols. The molecular weight or the average molecular weight of component (b), which can be calculated in known manner from the average functionality and the hydroxyl group content, is in the range from about 188 to about 1,200 (preferably in the range from 300 to 800). As for the rest, it is important in considering the type of and quantitative ratios between the individual components (b1), (b2), (b3), and (b4) to ensure that the percentage by weight of hydrophobic hydrocarbon R, R'', and R'' in component (b) is from about 5 to about 82% by weight (preferably from 10 to 40% by weight).

In essence, polyisocyanates or polyisocyanate mixtures of the diphenylmethane series of the type already discussed with respect to component (a1) are suitable for use as the polyisocyanate component (a2), which may optionally be mixed with the reaction product of (a1) and (b). Components (aI) and (a2), of course, need not have the same composition. The content of diisocyanatodiphenylmethane isomers in component (a2) is preferably from 35 to 60% by weight.

In the practical application of the process of the invention, the polyisocyanate component (al) is mixed with the alcohol component (b) at a temperature in the range from about 40 to about 180° C. (preferably at a temperature in the range from 60 to 120° C.), with the quantitative ratios between the components corresponding to an NCO/OH equivalent ratio of from about 1:0.01 to about 1:0.5 (preferably from 1:0.0.5 to 1:0.3). This modification reaction may be carried out batchwise or optionally continuously by addition of the alcohol component (b) to a stream of the polyisocyanate component (al).

The optional subsequent mixing of the reaction product of (a1) and (b) with the polyisocyanate component (a2) is preferably carried out simply by stirring of the components at room temperature.

In the practical application of the process according to the invention, the type of and quantitative ratio between the starting components should, of course, be selected within the limits of the foregoing disclosure so that the resultant mixtures according to the invention correspond to the figures discussed above with respect to NCO content and to isomer and homolog content.

The polyisocyanate mixtures of the invention are valuable starting materials for the preparation of polyurethane foams, particularly rigid polyurethane foams. For this purpose, the mixtures of the invention are used instead of the previously used polyisocyanate mixtures of the diphenylmethane series with the usual isocyanate-reactive compounds and other starting materials. "Alternative" blowing agents, however, are preferably used as the blowing agents. In addition to lowboiling aliphatic hydrocarbons, such as propane, butane or pentane, "alternative" blowing agents include hydrogen-containing halogenated hydrocarbons (or partly halogenated hydrocarbons), especially hydrogen-containing chlorofluorocarbons such as 1,1-difluoro-1-chloroethane, 1,1,1-trifluoro-2-fluoroethane, 1,1,1,-trifluoro-2,2-dichloroethane, 1-fluoro-1,1-dichloroethane, and, preferably, monochlorodifluoromethane. In the preparation of the foams, these "alternative" blowing agents are often used in combination with water as a chemical blowing agent (carbon dioxide formation). Water as the single blowing agent is also possible.

The following examples further illustrate details for the preparation of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all percentages are percentages by weight.

EXAMPLES

The following starting materials are used in the Examples:

Polyisocvanate 1: Polyisocyanate mixture of the diphenylmethane series consisting of 90% by weight diisocyanatodiphenylmethane isomers (composition: 90.7% by weight 4,4'-, 9.0% by weight 2,4'-, and 0.3% by weight 2,2'-diisocyanatodiphenylmethane) and 10% by weight higher-nuclear polyisocyanates of the diphenylmethane series; viscosity (25° C.) 25 mPa•s Polyisocvanate 2: Polyisocyanate mixture of the diphenylmethane series consisting of 50% by weight diisocyanatodiphenylmethane isomers (composition: 95.8% by weight 4,4'-, 4.0% by weight 2,4'-, and 0.2% by weight 2,2'-diisocyanatodiphenylmethane) and 50% by weight higher-nuclear polyisocyanates of the diphenylmethane series; viscosity (25° C.) 190 mPa•s Polyisocyanate 3: Polyisocyanate mixture of the diphenylmethane series consisting of 44% by weight diisocyanatodiphenylmethane isomers (composition: 94.5% by weight 4,4'-, 5.2% by weight 2,4'-, and 0.2% by weight 2,2'-diisocyanatodiphenylmethane) and 56% by weight higher-nuclear polyisocyanates of the diphenylmethane series; viscosity (25° C.) 420 mPa•s Polyether mixture 1: Polyether mixture prepared by propoxylation of a mixture of glycerol and stearyl alcohol (molar ratio of 1:1) using 2.303 mole of propylene oxide per mole of reactive hydrogen atoms of the starter mixture
OH value (mg KOH/g): 247
Water content (% by weight): 0.03
Melting point (° C.): TM 27–30
Average functionality: ca. 2
Average molecular weight: ca. 450
Content of R by weight: 26

Polyether mixture 2: Polyether mixture prepared by alkoxylation of a mixture of glycerol and stearyl alcohol (molar ratio of 1:1) using a mixture of 1.729 mole of propylene oxide and 0.75 mole of ethylene oxide per mole of reactive hydrogen atoms of the starter mixture
OH value (mg KOH/g): 252
Water content (% by weight): 0.04
Melting point (° C.): 36–48
Average functionality: 2
Average molecular weight: ca. 440
Content of R (% by weight): 26.6

Polyether mixture 3: Polyether mixture prepared by alkoxylation of a mixture of glycerol and dodecyl alcohol (molar ratio of 1:4.5) using 1.727 mole of propylene oxide per mole of active hydrogen atoms of the starter mixture
OH value (mg KOH/g): 242
Water content (% by weight: 0.01
Viscosity (mPa•s at 25° C.): 26
Average functionality: 1.36

Average molecular weight: ca. 310
Content of R (% by weight): 45
Polyether mixture 4: Polyether mixture prepared by alkoxylation of a mixture of glycerol and nonyl alcohol (molar ratio of 1:1) using a mixture of 2.862 mole of propylene oxide and 1.258 mole of ethylene oxide per mole of active hydrogen atoms of the starter mixture
OH value (mg KOH/g): 195
Water content (% by weight): 0.03
Viscosity (mPa•s at 25° C.) 84
Average functionality: 2
Average molecular weight: ca. 570
Content of R (% by weight): 23

EXAMPLE 1

Polyisocyanate 2 (575 g) was introduced into a three-necked flask equipped with a stirrer, dropping funnel, thermometer, nitrogen inlet, and outlet tube. Polyether mixture 1 (25 g) was then added dropwise under nitrogen with stirring over a period of 3 hours at a temperature of 60° C. The reaction mixture was then stirred for 1 hour at 60° C. and subsequently cooled to room temperature. The properties of the resulting reaction product are shown in Table 1.

EXAMPLE 2

Polyisocyanate 2 (760 g) was reacted with polyether mixture 2 (40 g) as in Example 1. A 600 g portion of the product obtained was mixed with another 400 g of polyisocyanate 2. The properties of the resulting product are shown in Table 1.

EXAMPLE 3

Polyisocyanate 2 (442.5 g) was reacted with polyether mixture 4 (57.5 g) as in Example 1. The properties of the resulting product are shown in Table 1.

EXAMPLE 4

Polyisocyanate 1 (900 g) was reacted with polyether mixture 3 (100 g) as in Example 1. The properties of the resulting product are shown in Table 1.

TABLE 1

| Substance | Product Properties Viscosity (mPa · s at 25° C.) | NCO content (% by weight) |
|---|---|---|
| Example 1 | 403 | 29.57 |
| Example 2 | 397 | 29.7 |
| Example 3 | 1316 | 26.62 |
| Example 4 | 47 | 27.6 |
| Polyisocyanate 3 | 420 | 31.2 |

EXAMPLES I-V

The polyisocyanate mixtures according to the invention obtained according to Examples 1 to 4, as well as polyisocyanate 3 for comparison, were used for the preparation of rigid foam test specimens. The following procedure was adopted:
Starting materials:
100 parts by wt. polyol mixture (OH value 500, viscosity at 25° C. of 1000 mPa•s) consisting of
(1) 20 parts by weight of a polyether (OH value 470) prepared by propoxylation of 2,3-diaminotoluene and subsequent ethoxylation of the propoxylation product (PO:EO ratio by weight of 1:1.25),
(2) 40 parts by weight of a polyether (OH value 415) prepared by propoxylation of a mixture of 1 mole of cane sugar, 3.15 mole of ethylene glycol, 2.45 mole of propylene glycol, and 0.13 mole of water,
(3) 25 parts by weight of a polyether (OH value 630) prepared by propoxylation of ethylenediamine,
(4) 7 parts by weight of glycerol, and
(5) 8 parts by weight of tris(chloroisopropyl) phosphate
1.5 parts by wt.: a commercially available polyether-polysiloxane foam stabilizer (Tegostab B 8404, a product of Goldschmidt AG, Essen)
1.3 parts by wt.: N,N-dimethylcyclohexylamine as catalyst
2.0 parts by wt.: water as blowing agent
12 parts by wt.: chlorodifluorodimethane as a further blowing agent
165 to 194 parts by wt.: polyisocyanate or polyisocyanate mixture (corresponding to an NCO index of 110)

The mixture of polyol, flameproofing agent, stabilizer, activator, and water was delivered to a multicomponent metering-mixing unit and mixed with chlorodifluoromethane and the polyisocyanate in a mixing head and immediately introduced into a mold closed on all sides.

Every mixture immediately began to foam and set after about 30 seconds. After 15 minutes, the molding (100 × 100 × 7 cm) was demolded. The molding had a compact surface skin on all sides and a cellular core.

The evaluation of the moldings and their properties are shown in Table 2. The solubility of chlorodifluoromethane at 25° C. in the polyisocyanates used are also shown in Table 2. Example V is a Comparison Example using unmodified polyisocyanate 3, which has characteristic data essentially corresponding to the polyisocyanate mixture of Example 1 according to the invention.

TABLE 2

| Properties of Rigid Foams | | | | | |
|---|---|---|---|---|---|
| | Example: | | | | |
| | I | II | III | IV | V |
| Polyisocyanate (parts by weight) | Ex. 1 (175) | Ex. 2 (174) | Ex. 3 (194) | Ex. 4 (187) | Polyisocyanate 3 (165) |
| Solubility of chlorodifluoromethane (g per 100 g polyisocyanate) | 2.26 | 2.31 | 2.17 | 2.19 | 1.94 |
| Average cell size, stereoscan photographs (mm³) | 0.022 | 0.015 | 0.027 | 0.029 | 0.039 |
| Open-cell character (ASTM D 2856-70), uncorrected (%) | 8 | 7 | — | — | 15 |
| Maximum dimensional change after storage (% by vol): | | | | | |
| 24 hr, −30° C. (DIN 53,431) | +0.1 | +0.1 | +0.1 | −0.1 | +0.2 |
| 24 hr, +100° C. (DIN 53,431) | −1.1 | −0.7 | −0.5 | +0.8 | −0.9 |
| 24 hr, +70° C./95% rel. hum. (ASTM 2126 F) | +0.8 | +0.6 | +0.8 | +0.6 | +1.0 |

TABLE 2-continued

| Properties of Rigid Foams | | | | | |
|---|---|---|---|---|---|
| | Example: | | | | |
| | I | II | III | IV | V |
| 7 d, +70° C./95% rel. hum. (ASTM 2126 F) | +0.4 | +0.4 | +0.6 | +0.5 | +0.6 |

As can be seen from Table 2, the rigid polyurethane foams exhibit distinct differences in their physical properties. The foams obtained with the polyisocyanate mixtures of Examples 1 to 4 according to the invention are superior in their physical properties to the comparison foam produced with polyisocyanate 3. In particular, the cell size of the foams according to the invention is distinctly smaller than that of the comparison product.

What is claimed is:

1. A liquid urethane-modified polyisocyanate mixture having an isocyanate content of from 25 to 33% obtained by a process comprising reacting
    (a1) a polyisocyanate or polyisocyanate mixture of the diphenylmethane series having a content of diisocyanatodiphenylmethane isomers of 30 to 100% by weight with
    (b) substoichiometric quantities of at least one alcohol selected from the group consisting of
        (b1) an alkoxylation product of an alcohol corresponding to the formula

R-OH wherein R is an aliphatic hydrocarbon group or olefinically unsaturated aliphatic hydrocarbon group containing 8 to 24 carbon atoms, wherein at least one mole of alkylene oxide is used per mole of active hydrogen atoms of said alcohol in the preparation of said alkoxylation products,
        (b2) an alkoxylation product of an amine corresponding to the formula $R'-NH_2$ wherein R' is an aliphatic hydrocarbon group or olefinically unsaturated aliphatic hydrocarbon group containing 8 to 24 carbon atoms, wherein at least one mole of alkylene oxide is used per mole of active hydrogen atoms of said amine in the preparation of said alkoxylation products,
        (b3) an alkoxylation product of an amide corresponding to the formula $R''-CO-NH_2$ wherein R" is an aliphatic hydrocarbon group or olefinically unsaturated aliphatic hydrocarbon group containing 8 to 24 carbon atoms, wherein at least one mole of alkylene oxide is used per mole of active hydrogen atoms of said amide in the preparation of said alkoxylation products, and
        (b4) at least one of (b1), (b2), and (b3) in admixture with an alkoxylation product of a monofunctional or polyfunctional starter molecule containing no groups R, R', or R" as defined above and having a molecular weight in the range from 18 to 342, wherein at least one mole of alkylene oxide is used per mole of active hydrogen atoms of the starter molecule in the preparation of said alkoxylation products, wherein the average molecular weight of component (b) is from 188 to 1,200, and wherein the type and quantitative ratios of components (b1), (b2), (b3), and (b4) are selected so that groups R, R', and R" collectively comprise form 5 to 82% by weight of component (b) and that component (b) has an average functionality of at least 1.3 (preferably 1.5-5).

2. A liquid urethane-modified polyisocyanate mixture according to claim 1 obtained by a process additionally comprising mixing the product obtained from reacting components (a1) and (b) with (a2) a polyisocyanate or polyisocyanate mixture of the diphenylmethane series containing no urethane groups and having a content of diisocyanatodiphenylmethane isomers of 30 to 100% by weight, with the proviso that diisocyanato
    diphenylmethane isomers comprise from 30 to 90% by weight of the total content of components (a1) and (a2) and polyisocyanates of the diphenylmethane series of higher than difunctionality comprise from 10 to 70% by weight of the total content of components (a1) and (a2).

3. A liquid urethane-modified polyisocyanate mixture according to claim 1 obtained by a process comprising reacting
    (a1) a polyisocyanate or polyisocyanate mixture of the diphenylmethane series having a content of diisocyanatodiphenylmethane isomers of 30 to 100% by weight
    (b) substoichiometric quantities of at least one alcohol selected from the group consisting of
        (b1) an alkoxylation product of an alcohol corresponding to the formula

R-OH wherein R is an aliphatic hydrocarbon group or olefinically unsaturated aliphatic hydrocarbon group containing 8 to 24 carbon atoms, wherein at least one mole of alkylene oxide is used per mole of active hydrogen atoms of said alcohol in the preparation of said alkoxylation products,
        (b2) an alkoxylation product of an amine corresponding to the formula $R'-NH_2$ wherein R' is an aliphatic hydrocarbon group or olefinically unsaturated aliphatic hydrocarbon group containing 8 to 24 carbon atoms, wherein at least one mole of alkylene oxide is used per mole of active hydrogen atoms of said amine in the preparation of said alkoxylation products,
        (b3) an alkoxylation product of an amide corresponding to the formula $R''-CO-NH_2$ wherein R" is an aliphatic hydrocarbon group or olefinically unsaturated aliphatic hydrocarbon group containing 8 to 24 carbon atoms, wherein at least one mole of alkylene oxide is used per mole of active hydrogen atoms of said amide in the preparation of said alkoxylation products, and (b4) at least one of (b1), (b2), and (b3) in admixture with an alkoxylation product of a monofunctional or polyfunctional starter molecule containing no groups R, R', or R" as defined above and having a molecular weight in the range from 18 to 342, wherein at least one mole of alkylene oxide is used per mole of active hydrogen atoms of the starter molecule in the preparation of said alkoxylation products, wherein the average molecular weight of component (b) is from 188 to 1,200, and wherein the type and quantitative ratios of components (b1), (b2), (b3), and (b4) are selected so that groups R, R', and R" collectively comprise form 5 to 82% by weight of component (b) and that component (b) has an average functionality of at least 1.3 (preferably 1.5–5); and mixing the product obtained from reacting components (a1) and (b) with (a2) a polyisocyanate or polyisocyanate mixture of the diphenylmethane series containing no urethane groups and having a content of diisocyanatodiphenylmethane isomers of 30 to 100% by weight, with the proviso that diisocyanatodiphenylmethane isomers comprise from 30 to 90% by weight of the total content of components (a1) and (a2) and polyisocyanates of the diphenylmethane series of higher than difunctionality comprise from 10 to 70% by weight of the total content of components (a1) and (a2).

4. A liquid urethane-modified polyisocyanate mixture according to claim 1 wherein the diisocyanatodiphenylmethane isomer of component (a1) is 4,4'-diisocyanatodiphenylmethane.

5. A liquid urethane modified polyisocyanate mixture according to claim 1 wherein the diisocyanatodiphenylmethane isomers of component (a1) are 60 to 99.5% by weight of 4,4'-diisocyanatodiphenylmethane, 0.5 to 40% by s weight 2,4'-diisocyanatodiphenylmethane, and 0 to 3% by weight 2,2'-diisocyanatodiphenylmethane, wherein the percentages total 100%.

6. A liquid urethane-modified polyisocyanate mixture according to claim 3 wherein the diisocyanatodiphenylmethane isomers of at least one of components (aI) or (a2) consists of 60 to 99.5% by weight of 4,4'-diisocyanatodiphenylmethane, 0.5 to 40% by weight 2,4'-diisocyanatodiphenylmethane, and 0 to 3% by weight 2,2'-diisocyanatodiphenylmethane, wherein the percentages total 100%, with the proviso that the total content of 2,4'-diisocyanatodiphenylmethane in components (a1) and (a2) is from 0.5 to 25% by weight based on the total content of diisocyanatodiphenylmethane isomers.

7. A process for the preparation of a liquid urethane-modified polyisocyanate mixture having an isocyanate content of from 25 to 33% comprising reacting (a1) a polyisocyanate or polyisocyanate mixture of the diphenylmethane series having a content of diisocyanato diphenylmethane isomers of 30 to 100% by weight with (b) substoichiometric quantities of at least one alcohol selected from the group consisting of (b1) an alkoxylation product of an alcohol corresponding to the formula

R-OH wherein R is an aliphatic hydrocarbon group or olefinically unsaturated aliphatic hydrocarbon group containing 8 to 24 carbon atoms, wherein at least one mole of alkylene oxide is used per mole of active hydrogen atoms of said alcohol in the preparation of said alkoxylation products, (b2) an alkoxylation product of an amine corresponding to the formula

R'-NH$_2$ wherein R' is an aliphatic hydrocarbon group or olefinically unsaturated aliphatic hydrocarbon group containing 8 to 24 carbon atoms, wherein at least one mole of alkylene oxide is used per mole of active hydrogen atoms of said amine in the preparation of said alkoxylation products, (b3) an alkoxylation product of an amide corresponding to the formula

R"-CO-NH$_2$ wherein R" is an aliphatic hydrocarbon group or olefinically unsaturated aliphatic hydrocarbon group containing 8 to 24 carbon atoms, wherein at least one mole of alkylene oxide is used per mole of active hydrogen atoms of said amide in the preparation of said alkoxylation products, and (b4) at least one of (b1), (b2), and (b3) in admixture with an alkoxylation product of a monofunctional or polyfunctional starter molecule containing no groups R, R', or R" as defined above and having a molecular weight in the range from 18 to 342, wherein at least one mole of alkylene oxide is used per mole of active hydrogen atoms of the starter molecule in the preparation of said alkoxylation products, wherein the average molecular weight of component (b) is from 188 to 1,200, and wherein the type and quantitative ratios of components (b1), (b2), (b3) and (b4) are selected so that groups R, R', and R" collectively comprise from 5 to 82% by weight of component (b), and that component (b) has an average functionality of at least 1.3 (preferably 1.5–5).

8. A process according to claim 7 additionally comprising mixing the product obtained from reacting components (a1) and (b) with (a2) a polyisocyanate or polyisocyanate mixture of the diphenylmethane series containing no urethane groups and having a content of diisocyanatodiphenylmethane isomers of 30 to 100% by weight, with the proviso that diisocyanatodiphenylmethane isomers comprise from 30 to 90% by weight of the total content of components (a1) and (a2) and polyisocyanates of the diphenylmethane series of higher than difunctionality comprise from 10 to 70% by weight of the total content of components (a1) and (a2).

9. A process for the preparation of a liquid urethane-modified polyisocyanate mixture according to claim 7 comprising reacting (a1) a polyisocyanate or polyisocyanate mixture of the diphenylmethane series having a content of diisocyanatodiphenylmethane isomers of 30 to 100% by weight with (b) substoichiometric quantities of at least one alcohol selected from the group consisting of
(b1) an alkoxylation product of an alcohol corresponding to the formula

R-OH wherein R is an aliphatic hydrocarbon group or olefinically unsaturated aliphatic hydrocarbon group containing 8 to 24 carbon atoms, wherein at least one mole of alkylene oxide is used per mole of active hydrogen atoms of said alcohol in the preparation of said alkoxylation products,
(b2) an alkoxylation product of an amine corresponding to the formula

R'-NH$_2$ wherein R' is an aliphatic hydrocarbon group or olefinically unsaturated aliphatic hydrocarbon group containing 8 to 24 carbon atoms, wherein at least one mole of alkylene oxide is used per mole of active hydrogen atoms of said amine in the preparation of said alkoxylation products,
(b3) an alkoxylation product of an amide corresponding to the formula

R''-CO-NH$_2$ wherein R'' is an aliphatic hydrocarbon group or olefinically unsaturated aliphatic hydrocarbon group containing 8 to 24 carbon atoms, wherein at least one mole of alkylene oxide is used per mole of active hydrogen atoms of said amide in the preparation of said alkoxylation products, and
(b4) at least one of (b1), (b2), and (b3) in admixture with an alkoxylation product of a monofunctional or polyfunctional starter molecule containing no groups R, R', or R'' as defined above and having a molecular weight in the range from 18 to 342, wherein at least one mole of alkylene oxide is used per mole of active hydrogen atoms of the starter molecule in the preparation of said alkoxylation products, wherein the average molecular weight of component (b) is from 188 to 1,200, and wherein the type and quantitative ratios of components (b1), (b2), (b3), and (b4) are selected so that groups R, R', and R'' collectively comprise from 5 to 82% by weight of component (b) and that component (b) has an average functionality of at least 1.3 (preferably 1.5-5); and mixing the product obtained from reacting components (a1) and (b) with (a2) a polyisocyanate or polyisocyanate mixture of the diphenylmethane series containing no urethane groups and having a content of diisocyanatodiphenylmethane isomers of 30 to 100% by weight, with the proviso that diisocyanatodiphenylmethane isomers comprise from 30 to 90% by weight of the total content of components (a1) and (a2) and polyisocyanates of the diphenylmethane series of higher than difunctionality comprise from 10 to 70% by weight of the total content of components (a1) and (a2).

10. A process according to claim 7 wherein the diisocyanatodiphenylmethane isomer of component (a1) is 4,4'-diisocyanatodiphenylmethane.

11. A process according to claim 7 wherein the diisocyanatodiphenylmethane isomers of component (a1) are 60 to 99.5% by weight of 4,4'-diisocyanatodiphenylmethane, 0.5 to 40% by weight 2,4'-diisocyanatodiphenylmethane, and 0 to 3% by weight 2,2'-diisocyanatodiphenylmethane, wherein the percentages total 100%.

12. A process according to claim 9 wherein the diisocyanatodiphenylmethane isomers of at least one of components (a1) or (a2) consists of 60 to 99.5% by weight of 4,4'-diisocyanatodiphenylmethane, 0.5 to 40% by weight 2,4'-diisocyanatodiphenylmethane, and 0 to 3% by weight 2,2'-diisocyanatodiphenylmethane, wherein the percentages total 100%, with the proviso that the total content of 2,4'-diisocyanatodiphenylmethane in components (a1) and (a2) is from 0.5 to 25% by weight based on the total content of diisocyanatodiphenylmethane isomers.

13. A method for preparing a polyurethane foam comprising reacting a liquid urethane-modified polyisocyanate mixture according to claim 1 having an isocyanate content of from 25 to 33% with an isocyanate-reactive compound in the presence of a blowing agent.

14. A method according to claim 13 wherein the polyurethane foam is a rigid polyurethane foam.

15. A method according to claim 13 wherein the blowing agent is a partly halogenated blowing agent or a low-boiling aliphatic hydrocarbon.

16. A method according to claim 13 wherein the blowing agent is water.

17. A method according to claim 13 wherein the blowing agent is monochlorodifluoromethane.

18. A method for preparing a polyurethane foam comprising reacting a liquid urethane-modified polyisocyanate mixture according to claim 3 having an isocyanate content of from 25 to 33% with an isocyanate-reactive compound in the presence of a blowing agent.

19. A method according to claim 18 wherein the polyurethane foam is a rigid polyurethane foam.

20. A method according to claim 18 wherein the blowing agent is a partly halogenated blowing agent or a low-boiling aliphatic hydrocarbon.

21. A method according to claim 18 wherein the blowing agent is monochlorodifluoromethane.

22. A method according to claim 18 wherein the blowing agent is water.

* * * * *